United States Patent
Nishihara et al.

(10) Patent No.: US 11,418,421 B2
(45) Date of Patent: Aug. 16, 2022

(54) MEASUREMENT SYSTEM AND MEASUREMENT METHOD

(71) Applicant: Nippon Telegraph and Telephone Corporation, Tokyo (JP)

(72) Inventors: Hidetaka Nishihara, Tokyo (JP); Toru Okugawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 88 days.

(21) Appl. No.: 15/734,662

(22) PCT Filed: Jun. 3, 2019

(86) PCT No.: PCT/JP2019/022034
§ 371 (c)(1),
(2) Date: Dec. 3, 2020

(87) PCT Pub. No.: WO2019/235440
PCT Pub. Date: Dec. 12, 2019

(65) Prior Publication Data
US 2021/0234779 A1    Jul. 29, 2021

(30) Foreign Application Priority Data

Jun. 4, 2018 (JP) .............................. JP2018-107192

(51) Int. Cl.
*H04L 43/0852* (2022.01)
*H04L 43/106* (2022.01)

(52) U.S. Cl.
CPC ........ *H04L 43/0852* (2013.01); *H04L 43/106* (2013.01)

(58) Field of Classification Search
None
See application file for complete search history.

(56) References Cited

U.S. PATENT DOCUMENTS 9,503,344 B2 * 11/2016 Chakrabarti ........ H04L 43/0858
10,721,187 B1 * 7/2020 Goldman .............. H04L 47/566
(Continued)

FOREIGN PATENT DOCUMENTS

CN      1881908 A  * 12/2006  ............. H04L 43/08
CN    101160821 A  *  4/2008  ............. H04L 1/203
(Continued)

OTHER PUBLICATIONS

Malkin, "Traceroute Using an IP Option," Network Working Group, Jan. 1993, 7 pages.
(Continued)

*Primary Examiner* — Andrew C Oh
(74) *Attorney, Agent, or Firm* — Fish & Richardson P.C.

(57) ABSTRACT

In a measurement system including a first transfer apparatus provided at a packet receiving edge of one network, a second transfer apparatus provided at a packet sending edge of the one network, and a measurement apparatus configured to receive a packet, the first transfer apparatus adds received time of the packet to the packet and transmits the packet, the second transfer apparatus receives the packet, adds sending time and a signature specific to the one network to the packet, and transmits the packet to which the received time, the sending time, and the signature are added, and the measurement apparatus receives the packet, and calculates a difference between the sending time and the received time to measure latency in the one network.

7 Claims, 11 Drawing Sheets

(56) References Cited

U.S. PATENT DOCUMENTS

| | | | |
|---|---|---|---|
| 2004/0085902 A1* | 5/2004 | Miller | H04L 47/10 370/235 |
| 2006/0187916 A1* | 8/2006 | Vasseur | H04L 12/56 370/389 |
| 2008/0019282 A1* | 1/2008 | Alaria | H04L 43/0858 370/252 |
| 2008/0117822 A1* | 5/2008 | Murphy | H04L 45/121 370/235 |
| 2009/0122805 A1* | 5/2009 | Epps | H04L 41/5009 370/417 |
| 2010/0238836 A1* | 9/2010 | Diab | H04L 49/90 370/254 |
| 2013/0089170 A1* | 4/2013 | Chiesa | H04J 3/0647 375/356 |
| 2013/0322244 A1* | 12/2013 | Matthews | A61K 31/506 370/235 |
| 2014/0136680 A1* | 5/2014 | Joshi | H04L 43/026 709/224 |
| 2016/0028603 A1* | 1/2016 | Chakrabarti | H04L 43/50 370/252 |
| 2016/0028604 A1* | 1/2016 | Chakrabarti | H04L 43/0858 370/252 |
| 2017/0093732 A1* | 3/2017 | Akhavain Mohammadi | H04L 45/38 |
| 2017/0125073 A1* | 5/2017 | Palmer | G11C 7/1036 |

FOREIGN PATENT DOCUMENTS

| | | | | |
|---|---|---|---|---|
| CN | 103563307 A | * | 2/2014 | H04L 43/045 |
| CN | 105515895 B | * | 7/2018 | |
| EP | 1011292 A2 | * | 6/2000 | H04Q 11/04 |
| EP | 1548980 A1 | * | 6/2005 | H04L 12/24 |
| EP | 2341650 A1 | * | 7/2011 | H04J 3/0667 |
| EP | 2381622 A1 | * | 10/2011 | H04J 3/0697 |
| HU | 200900074 A1 | * | 8/2010 | |
| WO | WO-2006133635 A1 | * | 12/2006 | H04L 43/08 |

OTHER PUBLICATIONS

Postel, "Internal Control Message Protocol," Network Working Group, Sep. 1981, 22 pages.

* cited by examiner

(a) TABLE STORED IN STORAGE UNIT

| NETWORK A | | NETWORK B | | NETWORK C | |
|---|---|---|---|---|---|
| RECEIVED TIME | TRANSMITTING TIME | RECEIVED TIME | TRANSMITTING TIME | ... | ... |
| $T_{A1}$ | $T_{A2}$ | $T_{B1}$ | $T_{B2}$ | ... | ... |

(b)

| LATENCY TIME IN NETWORK A | LATENCY TIME IN NETWORK B | LATENCY TIME IN NETWORK C |
|---|---|---|
| $T_{A2} - T_{A1}$ | $T_{B2} - T_{B1}$ | $T_{C2} - T_{C1}$ |

(c) TABLE STORED IN DETERMINATION UNIT

| | BETWEEN NETWORKS A AND B | BETWEEN NETWORKS B AND C |
|---|---|---|
| THRESHOLD | $S_{AB}$ | $S_{BC}$ |
| MEASURED VALUE | $T_{A1} - T_{B2}$ | $T_{B1} - T_{C2}$ |

(a) TABLE STORED IN STORAGE UNIT

| RECEIVED TIME | READ TIME |
|---|---|
| $T_{B1}$ | $T_{C2}$ |

(b) TABLE STORED IN DETERMINATION UNIT

| | BETWEEN NETWORKS B AND C |
|---|---|
| THRESHOLD | $S_{BC}$ |
| MEASURED VALUE | $T_{B1}-T_{C2}$ |

(a) TABLE STORED IN STORAGE UNIT

| NETWORK A | NETWORK B | NETWORK C |
|---|---|---|
| TRANSMITTING TIME | TRANSMITTING TIME | TRANSMITTING TIME |
| $T_{A2}$ | $T_{B2}$ | $T_{C2}$ |

(b)

| LATENCY TIME IN NETWORK A | LATENCY TIME IN NETWORK B | LATENCY TIME IN NETWORK C |
|---|---|---|
| $T_{A2} - T_{B2}$ | $T_{B2} - T_{C2}$ | $T_{C2}$ |

(c) TABLE STORED IN DETERMINATION UNIT

|  | BETWEEN NETWORKS A AND B | BETWEEN NETWORKS B AND C |
|---|---|---|
| THRESHOLD | $S_{AB}$ | $S_{BC}$ |
| MEASURED VALUE | $T_{A2} - T_{B2}$ | $T_{B2} - T_{C2}$ |

MEASUREMENT SYSTEM AND MEASUREMENT METHOD

CROSS-REFERENCE TO RELATED APPLICATIONS

This application is a National Stage application under 35 U.S.C. § 371 of International Application No. PCT/JP2019/022034, having an International Filing Date of Jun. 3, 2019, which claims priority to Japanese Application Serial No. 2018-107192, filed on Jun. 4, 2018. The disclosure of the prior application is considered part of the disclosure of this application, and is incorporated in its entirety into this application.

TECHNICAL FIELD

The present invention relates to a technique of measuring latency of packets delivered via a plurality of networks as observed in each of the networks.

BACKGROUND ART

Some examples of existing techniques used to measure latency in networks include ping (NPL 1) and traceroute (NPL 2).

Figure 1:
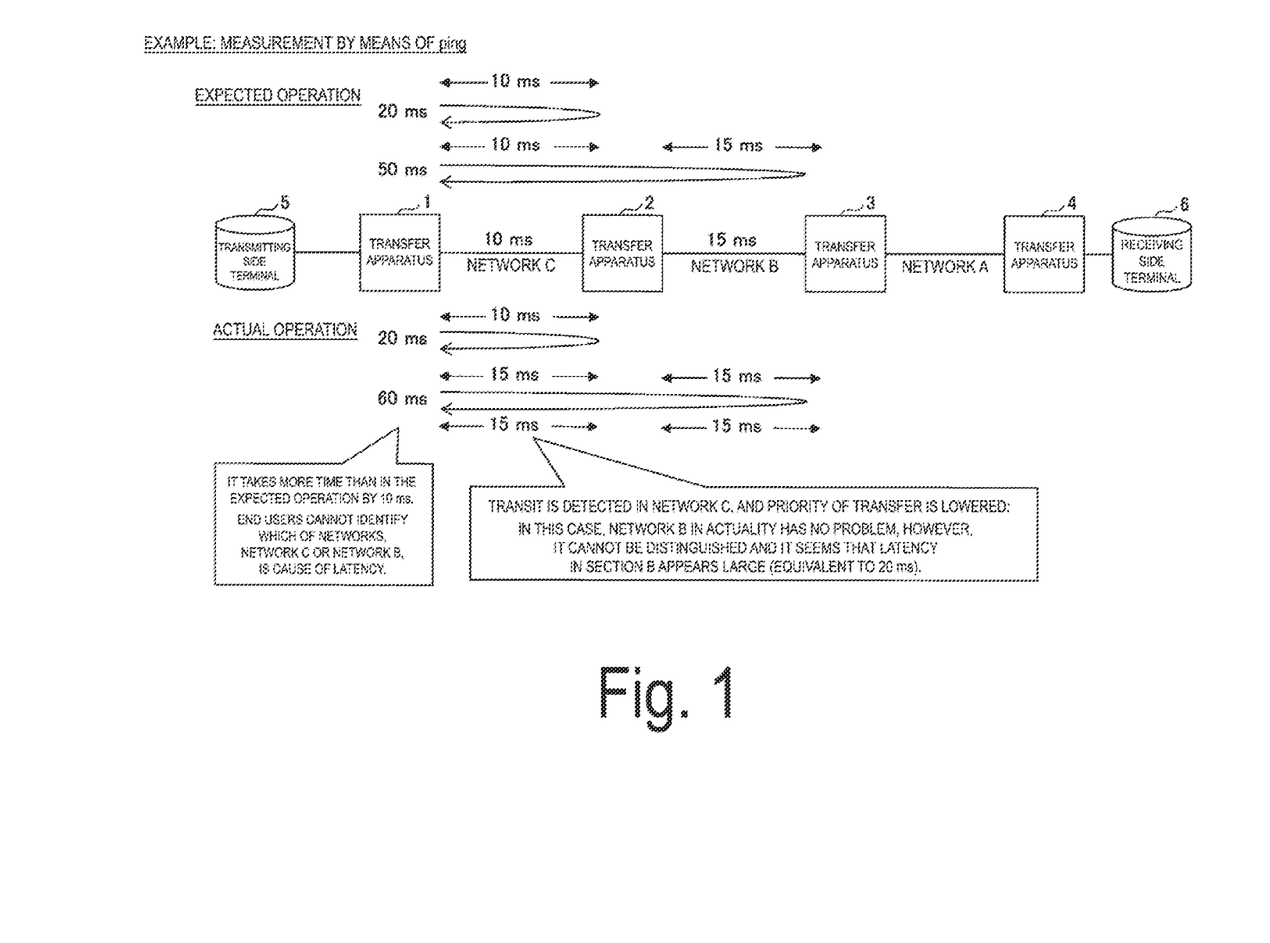
FIG. 1 is a diagram for describing an example of measurement.

With reference to FIG. 1, an example of measurement by means of ping will be described. In the example illustrated in FIG. 1, there are networks A to C that include transfer apparatuses 1 to 4 each serving as a transfer apparatus located at the edge of a corresponding network, and ping packets are transmitted from a transmitting side terminal 5. In expected operation of the example illustrated in FIG. 1, measured round-trip latency between the transfer apparatus 1 and the transfer apparatus 2 indicates 20 ms, and measured round-trip latency between the transfer apparatus 1 and the transfer apparatus 3 is expected to be 50 ms.

In one case of actual measurement performed by way of experiment, measured round-trip latency between the transfer apparatus 1 and the transfer apparatus 2 indicates 20 ms, as expected. Measured round-trip latency between the transfer apparatus 1 and the transfer apparatus 3; however, indicates 60 ms, which takes more time than in the expected operation by 10 ms. End users cannot identify which of the networks, the network C or the network B, is the cause of the latency. In this example, transit is detected in the network C, and priority of transfer is lowered. In this case, the network B in actuality has no problem; however, it cannot be distinguished and it seems that latency in the section B appears large (equivalent to 20 ms), for example.

To provide information as to which network of a plurality of networks causes large latency, for example, some existing techniques record packet arrival time in each transfer apparatus with the use of ping, traceroute, or the like.

CITATION LIST

Non Patent Literature

NPL 1: ICMP, https://tools.ietf.org/html/rfc792
NPL 2: TraceRoute, https://tools.ietf.org/html/rfc1393

SUMMARY OF THE INVENTION

Technical Problem

Such a plurality of networks; however, include an Untrusted-NW whose authenticity of measurement results is uncertain to be reliable, as well as a Trusted-NW whose measurement results are reliable. For this reason, existing techniques as mentioned above do not necessarily perform reliable measurement of latency in each network with the use of accurate time. For example, when a large latency value is observed in an Untrusted-NW, the entrusted-NW may make a false report, to avoid the worth of the entrusted-NW being depreciated due to poor quality of the network.

In other words, each network presupposes reliable recording of accurate time when the existing techniques are used, which means that the existing techniques cannot be suitably applied to networks that may include an Untrusted-NW. In addition, the existing techniques presuppose the use of the same route for upstream and downstream traffic. The use of different routes however, hinders accurate measurement of values.

The present invention is made in view of the circumstances described above, and has an object to provide a technique that enables accurate measurement of latency of each network in a plurality of networks.

Means for Solving the Problem

The technique of the disclosure provides a measurement system including:

a first transfer apparatus provided at a packet receiving edge of one network;

a second transfer apparatus provided at a packet sending edge of the one network; and a measurement apparatus configured to receive a packet transmitted through the first transfer apparatus, the one network, and the second transfer apparatus, wherein, the first transfer apparatus, when the first transfer apparatus receives the packet, adds received time of the packet to the packet and transmits the packet to which the received time is added, the second transfer apparatus receives the packet to which the received time is added, adds sending time and a signature specific to the one network to the packet, and transmits the packet to which the received time, the sending time, and the signature are added, and the measurement apparatus receives the packet to which the received time, the sending time, and the signature are added and calculates a difference between the sending time and the received time to measure latency in the one network.

Effects of the Invention

The technique of the disclosure provides a technique that enables accurate measurement of latency of each network in a plurality of networks.

DESCRIPTION OF EMBODIMENTS

Example 1 and Example 2 will be described below as an embodiment of the present invention. Both of Examples 1 and 2 are based on an assumption that time information is delivered to all networks, allowing apparatuses (such as measurement units and transfer apparatuses) to establish time synchronization by means of GPS or the like. Further, Examples 1 and 2 to be described below assume a configuration including a plurality of networks. However, a latency measurement technique according to the present invention can also be applied to a single network.

Example 1

Overall Configuration and Overview of Operation of System

Figure 2:
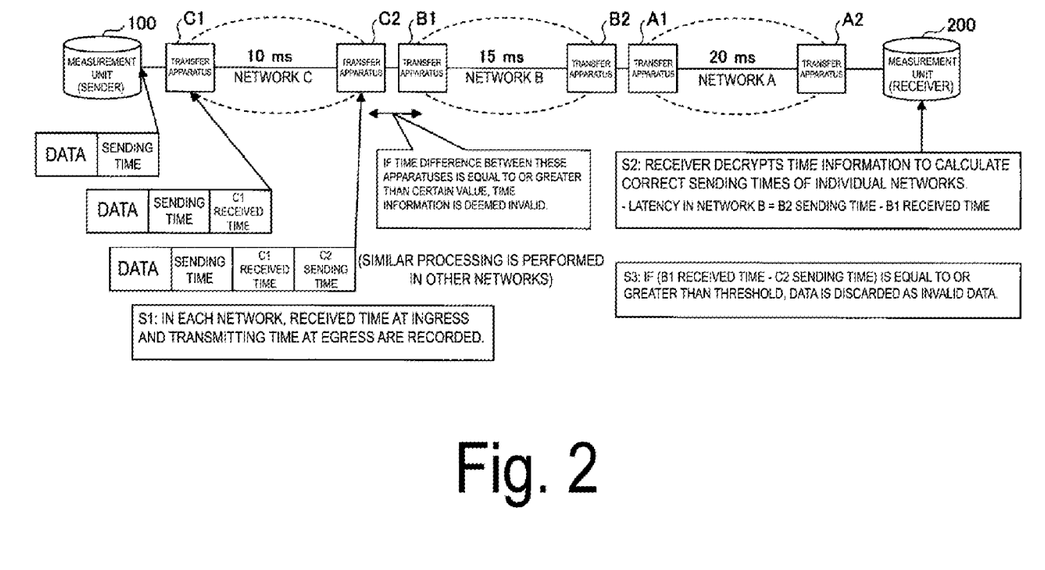
FIG. 2 is a diagram for describing Example 1.

FIG. 2 is a diagram illustrating an example of an overall configuration of a system according to Example 1. As illustrated in FIG. 2, the system includes a measurement unit (sender) 100 that serves as a sender of packets and a measurement unit (receiver) 200 that serves as a receiver of packets. A network A, a network B, and a network C are present between the measurement unit (sender) 100 and the measurement unit (receiver) 200.

In FIG. 2, for each of the networks, a transfer apparatus at its receiving edge and a transfer apparatus at its sending edge are illustrated. In other words, for the network A, a transfer apparatus A1 at its receiving side and a transfer apparatus A2 at its sending side are illustrated. For the network B, a transfer apparatus B1 at its receiving side and a transfer apparatus B2 at its sending side are illustrated. For the network C, a transfer apparatus C1 at its receiving side and a transfer apparatus C2 at its sending side are illustrated. Each of the transfer apparatuses is a router, for example, but is not necessarily limited to a router. Further, each of the measurement units may be referred to as a measurement apparatus. The operation of the system according to Example 1 is as follows.

In S1, in each network, a transfer apparatus at the receiving edge adds packet received time to received packets. A transfer apparatus at the sending edge adds packet transmitting time and a signature specific to each network to the packets to which the packet received time is added, and then transfers the obtained packets.

The above operation will be described in more detail by taking the part of the network C of FIG. 2 as an example. The measurement unit (sender) 100 sends out packets that are obtained by adding sending time to data. The transfer apparatus C1 of the network C at the receiving edge adds time at which the transfer apparatus C1 received the packets (C1 received time) to the packets received from the measurement unit (sender) 100, and sends out the packets obtained by adding the time to the network C. The transfer apparatus C2 at the sending edge sequentially adds time at which the transfer apparatus C2 sends out packets (C2 sending time) and a signature specific to the network C to the packets received from the transfer apparatus C1. The transfer apparatus C2 may encrypt the time information and the signature.

Operation regarding the signature is as follows: For example, the transfer apparatus C2 calculates a hash value of the information (C1 received time and C2 sending time) added in the network C, generates a signature by encrypting the hash value with a private key specific to the network C, and adds the signature to the packets. In this case, in the measurement unit (receiver) 200, the signature is decrypted with a public key of the network C, and a hash value obtained by the decryption and the hash value of the information (C1 received time and C2 sending time) added to the packets are compared. If the results of the comparison show that the hash values match each other, it can be confirmed that the information is not manipulated. Note that methods for a signature are not necessarily limited to the method described above.

Similar processing is performed in other networks as well. Packets containing pieces of time information added by the transfer apparatuses located at the edge of individual networks and signatures specific to the individual networks are delivered to the measurement unit (receiver) 200.

In S2, the measurement unit (receiver) 200 performs decryption processing on the pieces of time information and the signatures added to the packets to thereby acquire correct received times and sending times at the individual networks. Using the differences between those times, the measurement unit (receiver) 200 can measure propagation delay.

For example, as illustrated in FIG. 2, to calculate latency in the network B, the measurement unit (receiver) 200 calculates "B2 sending time−B1 received time". The same applies to the calculation of latency in the network A and latency in the network C.

In S3, the measurement unit (receiver) 200 compares received time at a network in a subsequent stage (for example, received time at the transfer apparatus B1) and sending time at a network in a preceding stage (for example, sending time at the transfer apparatus C2). If the difference between those times is equal to or greater than a certain value (for example, a certain threshold), the measurement unit (receiver) 200 discards data as false data. The data to be discarded may be only data related to the difference (for example, the time information of the network in the subsequent stage and the time information of the network in the preceding stage), or may be the whole packets.

Effects

In Example 1, packets are added signatures specific to individual networks. This configuration prevents outsiders from manipulating time information. In addition, even when sending time is manipulated into time earlier than actual time with the deliberate intention of making latency appear smaller than it actually is, the above configuration makes it possible to detect such unauthorized operation because it increases a difference between the manipulated sending time and received time in the subsequent stage. Conversely, even when received time is manipulated into time later than actual time with the deliberate intention of a network in a subsequent stage to make latency in the network in the subsequent stage appear smaller than it actually is, the above configuration makes it possible to detect such manipulation as unauthorized operation because it increases a difference between the manipulated received time and sending time at a network in a preceding stage.

Consequently, the technique according to Example 1 allows for accurate measurement of latency in each network. In addition, measurement can be performed in a target direction to be measured, by virtue of to the configuration of Example 1 in which measurement is performed with packets sent out in one direction.

Detailed Configuration of Apparatuses

Figure 3:
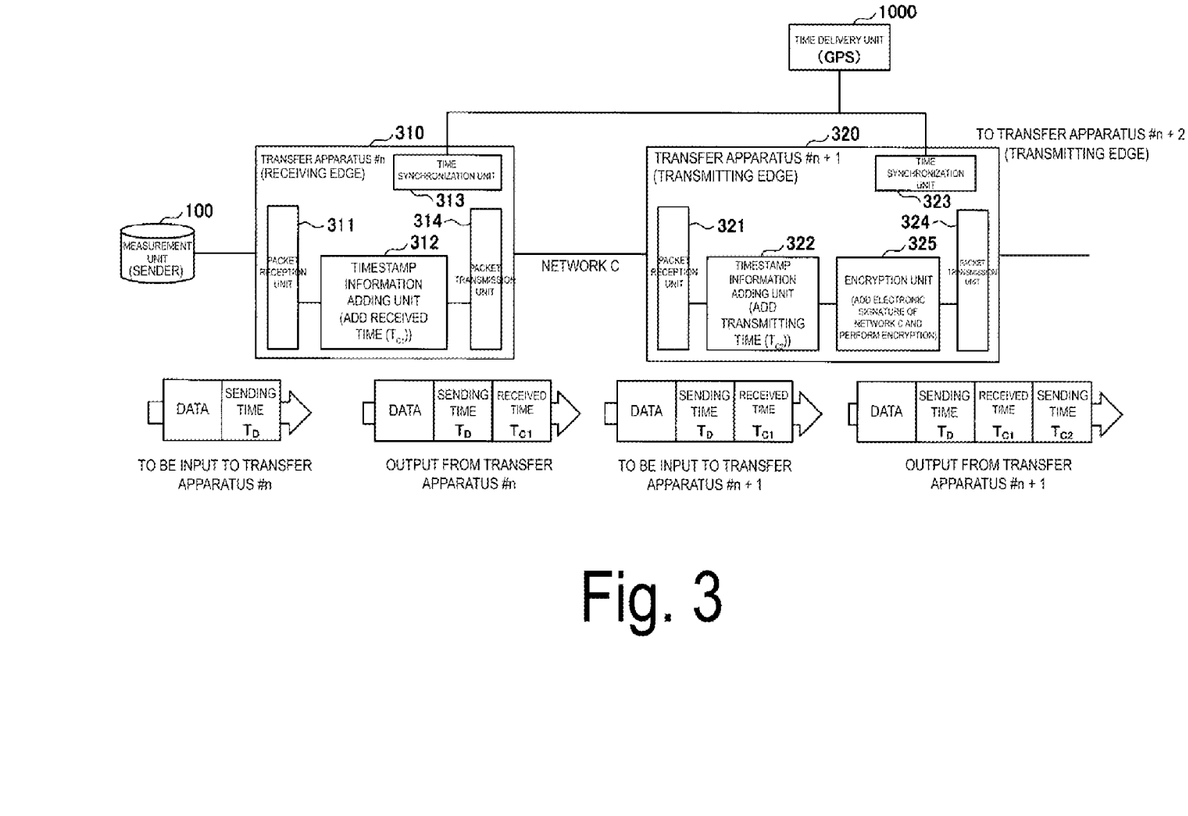
FIG. 3 is a functional block diagram of apparatuses according to Example 1.

FIG. 3 illustrates a configuration of a transfer apparatus 310 (transfer apparatus #n) at the receiving edge and a transfer apparatus 320 (transfer apparatus #n+1) at the sending edge. In one example, FIG. 3 illustrates transfer apparatuses of the network C.

As illustrated in FIG. 3, the transfer apparatus 310 at the receiving edge includes a packet reception unit 311, a timestamp information adding unit 312, a packet transmission unit 314, and a time synchronization unit 313.

Further, as illustrated in FIG. 3, the transfer apparatus 320 at the sending edge includes a packet reception unit 321, a timestamp information adding unit 322, an encryption unit 325, a packet transmission unit 324, and a time synchronization unit 323. The time synchronization units 313 and 323 illustrated in FIG. 3 receive time information from a time delivery unit 1000 (for example, a GPS apparatus). In this manner, the transfer apparatuses can establish time synchronization.

An operation of each of the units will be described according to the flow of packets illustrated in FIG. 3.

The packet reception unit 311 of the transfer apparatus 310 receives packets of data to which sending time $T_D$ is added. The timestamp information adding unit 312 adds received time $T_{C1}$ to the packets, and the packet transmission unit 314 sends out the packets to which the received time $T_{C1}$ is added.

The packet reception unit 321 of the transfer apparatus 320 receives the packets sent out from the packet transmission unit 314. The timestamp information adding unit 322 adds sending time $T_{C2}$ to the packets. Further, the encryption unit 325 adds an electronic signature of the network C to the packets and encrypts the added time information and the like. The packet transmission unit 324 sends out the packets.

Figure 4:
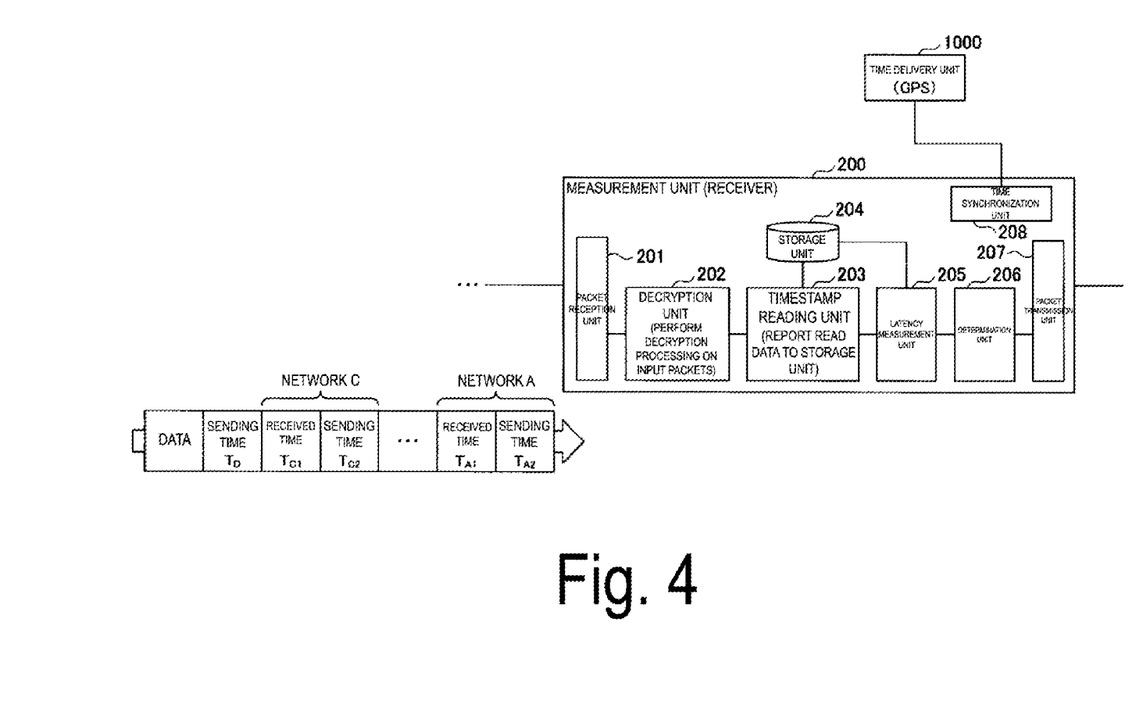
FIG. 4 is a functional block diagram of an apparatus according to Example 1.

FIG. 4 illustrates a configuration of the measurement unit (receiver) 200. As illustrated in FIG. 4, the measurement unit (receiver) 200 includes a packet reception unit 201, a decryption unit 202, a timestamp reading unit 203, a storage unit 204, a latency measurement unit 205, a determination unit 206, a packet transmission unit 207, and a time synchronization unit 208. The time synchronization unit 208 illustrated in FIG. 4 receives time information from the time delivery unit 1000 (for example, a GPS apparatus). In this manner, the transfer apparatuses and the measurement unit (receiver) can establish time synchronization.

An operation of each of the units performed when packets are received as illustrated in FIG. 4 will be described.

The packet reception unit 201 receives packets. The packets are added sending time at the measurement unit (sender) 100, received times and sending times at individual networks, and signatures specific to the individual networks. The decryption unit 202 performs decryption processing on the input packets. In the decryption processing, for example, the pieces of time information of the individual networks are subject to verification using the signatures, as has been described in the above.

The timestamp reading unit 203 reads the pieces of time information of the individual networks and stores the read pieces of time information in the storage unit 204.

Figure 5:
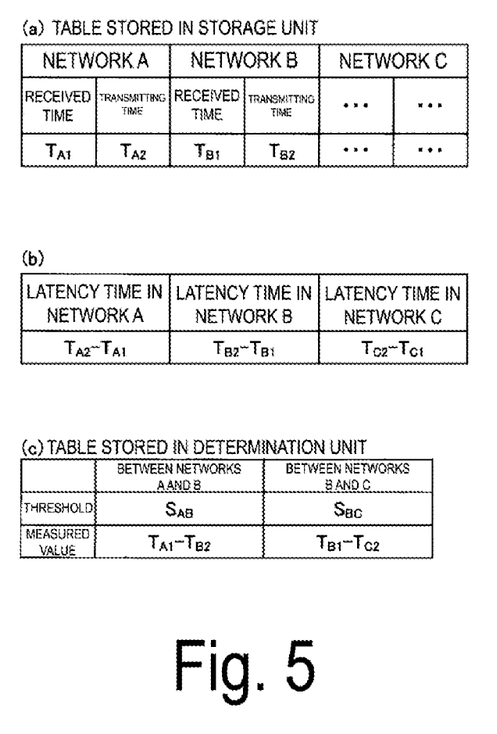
FIG. 5 is a diagram illustrating tables to be stored, for example.

A table to be stored in the storage unit 204 is illustrated in FIG. 5(a). As illustrated in FIG. 5(a), the storage unit 204 stores received times and sending times at individual networks.

Next, the latency measurement unit 205 refers to the sending times and the received times stored in the storage unit 204 to calculate (measure) latency in each of the networks. As illustrated in FIG. 5(b), for example, latency time in the network A is calculated by: $T_{A2}-T_{A1}$.

Next, the determination unit 206 performs calculation for each pair of adjacent networks, specifically, calculates a difference between received time and sending time between networks. If the calculated difference is greater than a threshold, for example, the determination unit 206 discards the received time and the sending time used in the calculation.

Note that the threshold is set for each network in advance. FIG. 5(c) illustrates a table stored in the determination unit 206. The thresholds for individual networks are stored in the table. In the example of FIG. 5(c), for example, if $T_{A1}-T_{B2}$ is greater than $S_{AB}$, $T_{A1}$ and $T_{B2}$ are discarded.

For example, the packet transmission unit 207 may output the packets input into the measurement unit (receiver) 200 without subjecting the packets to processing. Alternatively, the packet transmission unit 207 may output processed packets obtained by removing time information from the input packets. Alternatively, the packet transmission unit 207 may output processed packets obtained by removing time information from the input packets and adding measurement results (such as the latency time in each network). Alternatively, the packet transmission unit 207 may generate packets containing the measurement results and may transmit the packets.

Example 2

Next, Example 2 will be described.

Overall Configuration and Overview of Operation of System

Figure 6:
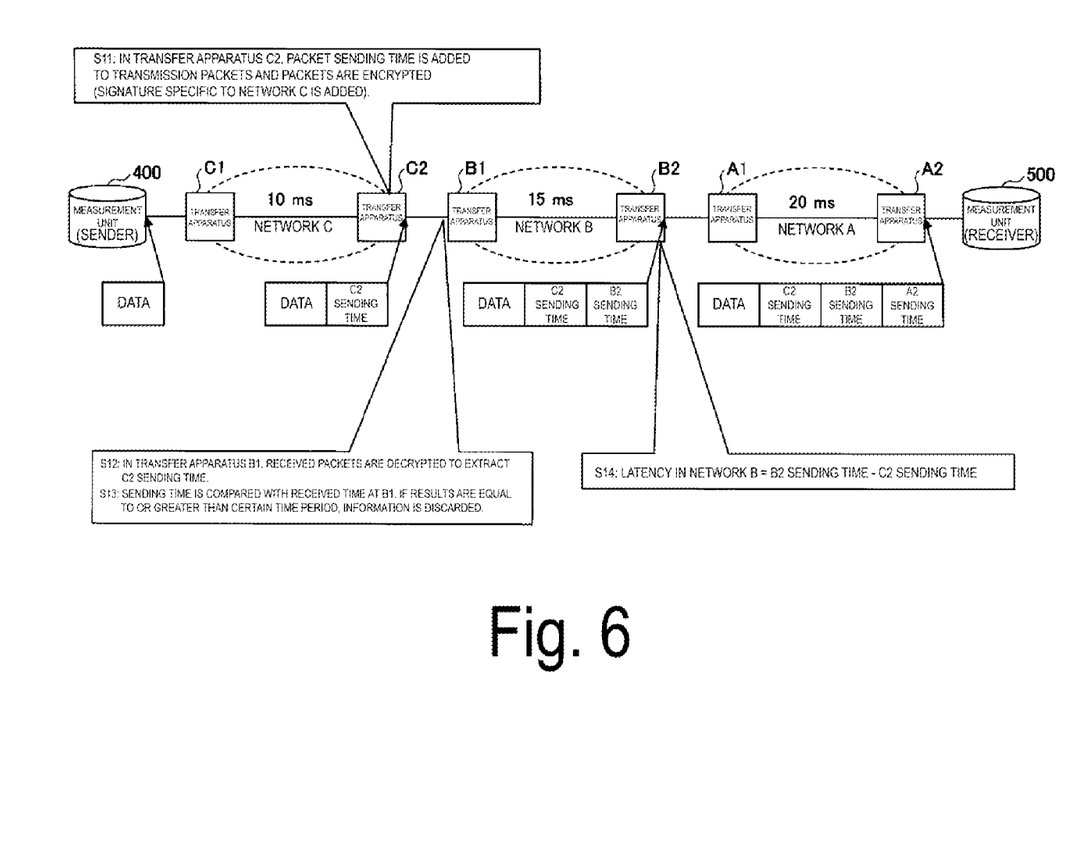
FIG. 6 is a diagram for describing Example 2.

FIG. 6 is a diagram illustrating an example of an overall configuration of a system according to Example 2. As illustrated in FIG. 6, the system includes a measurement unit (sender) 400 that serves as a sender of packets and a measurement unit (receiver) 500 that serves as a receiver of packets. A network A, a network B, and a network C are present between the measurement unit (sender) 400 and the measurement unit (receiver) 500.

In FIG. 6, for each of the networks, a transfer apparatus at its receiving edge and a transfer apparatus at its sending edge are illustrated. In other words, for the network A, a transfer apparatus A1 at its receiving side and a transfer apparatus A2 at its sending side are illustrated. For the network B, a transfer apparatus B1 at its receiving side and a transfer apparatus B2 at its sending side are illustrated. For the network C, a transfer apparatus C1 at its receiving side and a transfer apparatus C2 at its sending side are illustrated. Each of the transfer apparatuses is a router, for example, but is not necessarily limited to a router. Further, each of the measurement units may be referred to as a measurement apparatus. The operation of the system according to Example 2 is as follows.

In S11, in each network, a transfer apparatus at the sending edge (for example, the transfer apparatus C2) sequentially adds packet sending time and a signature specific to the network to packets received from a transfer apparatus at the receiving edge, encrypts the packets, and transfers the encrypted packets.

In S12, a transfer apparatus of an adjacent network at the receiving edge (for example, the transfer apparatus B1) receives the packets sent out from the transfer apparatus at the sending edge. The transfer apparatus at the receiving edge performs decryption processing to acquire the sending time added to the received packets. In S13, the transfer apparatus at the receiving edge measures propagation delay between those networks by using the difference between received time of the packets and the acquired sending time. If the propagation delay is equal to or greater than a certain value (threshold), the transfer apparatus at the receiving edge discards the time information.

The above operations will be described in more detail by taking the part of the network C and the network B of FIG. 6 as an example. The measurement unit (sender) 400 sends out packets including data. The transfer apparatus C1 of the network C at the receiving edge sends out the packets received from the measurement unit (sender) 400 to the network C. The transfer apparatus C2 at the sending edge sequentially adds time at which the transfer apparatus C2 sends out packets (C2 sending time) and a signature specific to the network C to the packets received from the transfer apparatus C1. The transfer apparatus C2 may encrypt the added time information and signature. The transfer apparatus C2 transfers the packets to which the pieces of information described above are added.

Operation regarding the signature is as follows: For example, the transfer apparatus C2 calculates a hash value of the information (C2 sending time) added in the network C, generates a signature by encrypting the hash value with a private key specific to the network C, and adds the signature to the packets. In this case, in the transfer apparatus B1 in the subsequent stage and the measurement unit (receiver) 500, the signature is decrypted with a public key of the network C, and a hash value obtained by the decryption and the hash value of the information (C2 sending time) added to the packets are compared. If the results of the comparison show that the hash values match each other, it can be confirmed that the information is not manipulated. Note that methods for a signature are not necessarily limited to the method described above.

The transfer apparatus B1 of the network B at the receiving edge receives the packets transmitted from the transfer apparatus C2 and performs decryption processing to extract the C2 sending time. The transfer apparatus B1 compares received time of the packets and the C2 sending time. If the difference between those times is equal to or greater than a threshold, the transfer apparatus B1 discards the time information (C2 sending time). Note that the whole packets may be discarded. If the difference between those times is less than the threshold, the packets are transferred, with no information being discarded.

Processing similar to the processing performed in the transfer apparatus C2 and the transfer apparatus B1 is performed in transfer apparatuses of other networks as well. Packets containing sending times added by transfer apparatuses of individual networks at the sending edge are delivered to the measurement unit (receiver) 500.

In S14, the measurement unit (receiver) 500 performs decryption processing (such as verification using signatures) to acquire the sending times added to the received packets. The measurement unit (receiver) 500 calculates the differences between the networks to calculate latency time in each of the networks. For example, latency in the network B can be calculated by: "B2 sending time−C2 sending time".

Effects

In Example 2 as well, packets are added signatures specific to individual networks. This configuration prevents outsiders from manipulating time information. In addition, even when sending time is manipulated into time earlier than actual time with the deliberate intention of making latency appear smaller than it actually is, a network in a subsequent stage discards the manipulated sending time or packets on the condition that the difference between the manipulated sending time and received time is equal to or greater than a certain value. Note that, in this case, there is no advantage for the network in the subsequent stage to accept the manipulated sending time or packets because, in doing so, latency in the network in the subsequent stage appears larger than it actually is. In addition, the above configuration makes it possible to detect such unauthorized operation because it increases a difference between the manipulated sending time and received time in the subsequent stage. Conversely, even when received time is manipulated into time later than actual time with the deliberate intention of a network in a subsequent stage to make latency in the network in the subsequent stage appear smaller than it actually is, the above configuration makes it possible to detect such manipulation as unauthorized operation because it increases a difference between the manipulated received time and sending time at a network in a preceding stage.

Consequently, Example 2 allows for accurate measurement of latency in each network as well. In addition, measurement can be performed in a target direction to be measured, by virtue of to the configuration of Example 2 in which measurement is performed with packets sent out in one direction as well.

Detailed Configuration of Apparatuses

Figure 7:
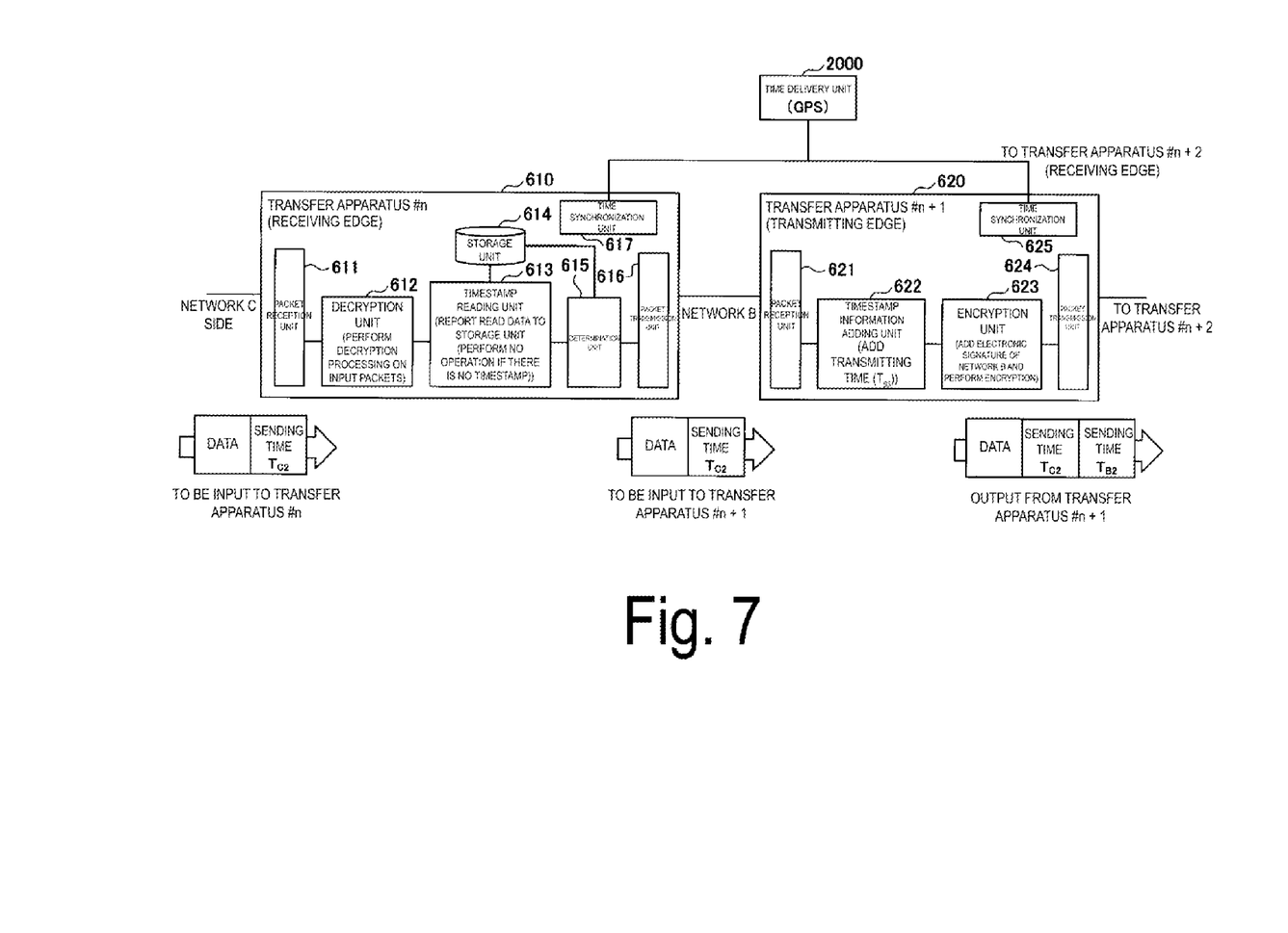
FIG. 7 is a functional block diagram of apparatuses according to Example 2.

FIG. 7 illustrates a configuration of a transfer apparatus 610 (transfer apparatus #n) at the receiving edge and a transfer apparatus 620 (transfer apparatus #n+1) at the sending edge. In one example, FIG. 7 illustrates transfer apparatuses of the network B.

As illustrated in FIG. 7, the transfer apparatus 610 at the receiving edge includes a packet reception unit 611, a decryption unit 612, a timestamp reading unit 613, a storage unit 614, a determination unit 615, a packet transmission unit 616, and a time synchronization unit 617.

Further, as illustrated in FIG. 7, the transfer apparatus 620 at the transmitting edge includes a packet reception unit 621, a timestamp information adding unit 622, an encryption unit 623, a packet transmission unit 624, and a time synchronization unit 625. The time synchronization units 617 and 625 illustrated in FIG. 7 receive time information from a time delivery unit 2000 (for example, a GPS apparatus). In this manner, the transfer apparatuses can establish time synchronization.

An operation of each of the units will be described according to the flow of packets illustrated in FIG. 7.

Figure 8:
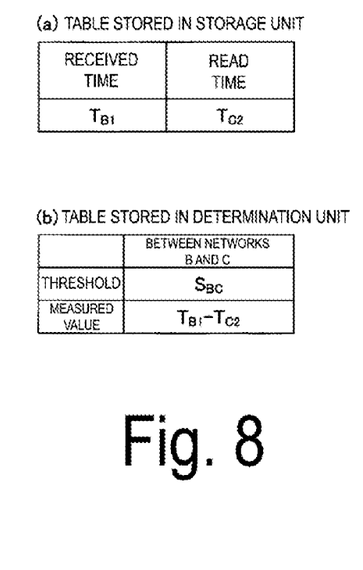
FIG. 8 is a diagram illustrating tables to be stored, for example.

The packet reception unit 611 receives packets to which sending time $T_{C2}$ is added. The decryption unit 612 performs decryption processing (such as verification using signatures) on the packets. The timestamp reading unit 613 reads the sending time $T_{C2}$ and stores the sending time $T_{C2}$ and received time $T_{B1}$ at which the packets are received in the storage unit 614. As illustrated in FIG. 8(a), the pieces of information described above are stored in the storage unit 614.

The determination unit 615 calculates the difference between the received time $T_{B1}$ and the sending time $T_{C2}$ and compares the difference and a threshold. If the difference is greater than the threshold, the determination unit 615 discards data. The data to be discarded is the sending time $T_{C2}$, for example. Alternatively, the whole packets may be discarded.

The threshold used for the determination is a value set for each individual network in advance. FIG. 8(b) illustrates a table stored in the determination unit 615. As illustrated in FIG. 8(*b*), the threshold is stored in the table.

The packet transmission unit 616 transmits the packets to which the sending time $T_{C2}$ is added. The packets are transmitted through the network B to be delivered to the transfer apparatus 620 at the sending edge. The packet reception unit 621 receives the packets.

The timestamp information adding unit 622 adds sending time $T_{B2}$ to the packets. Further, the encryption unit 623 adds an electronic signature of the network B to the packets. The packet transmission unit 625 sends out the packets.

Figure 9:
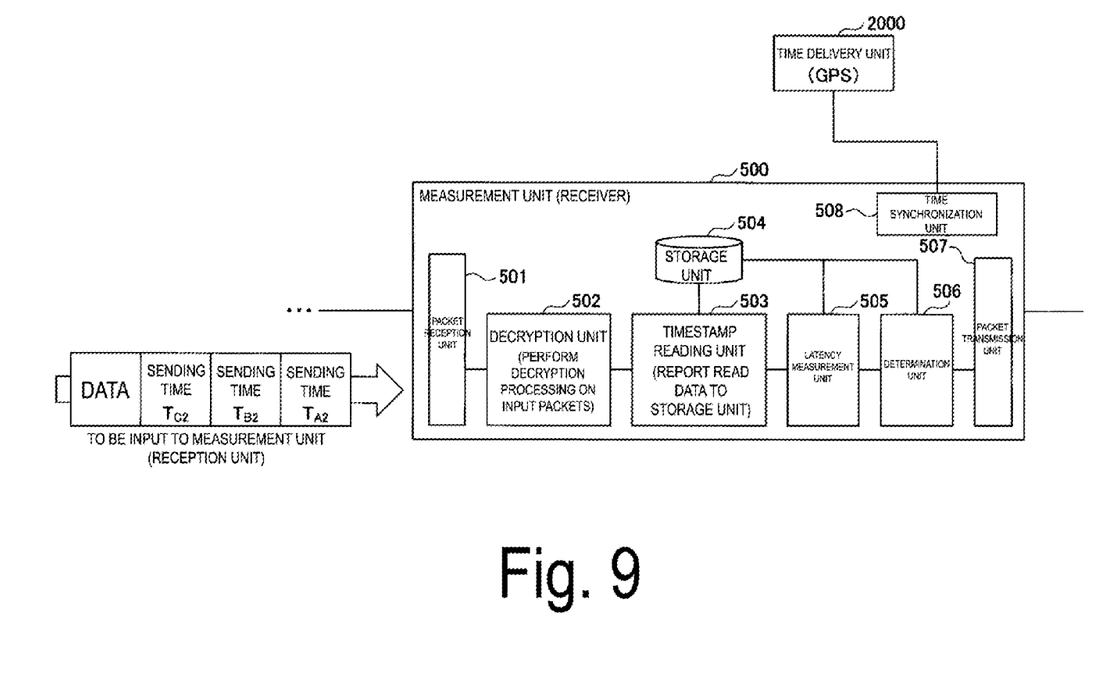
FIG. 9 is a functional block diagram of an apparatus according to Example 2.

FIG. 9 illustrates a configuration of the measurement unit (receiver) 500. As illustrated in FIG. 9, the measurement unit (receiver) 500 includes a packet reception unit 501, a decryption unit 502, a timestamp reading unit 503, a storage unit 504, a latency measurement unit 505, a determination unit 506, a packet transmission unit 507, and a time synchronization unit 508. The time synchronization unit 508 illustrated in FIG. 9 receives time information from the time delivery unit 2000 (for example, a GPS apparatus). In this manner, the transfer apparatuses and the measurement unit (receiver) can establish time synchronization.

An operation of each of the units performed when packets are received as illustrated in FIG. 9 will be described.

The packet reception unit 501 receives packets to which sending times of individual networks are added. The decryption unit 502 performs decryption processing on the input packets. The timestamp reading unit 203 reads pieces of time information added to the packets and stores the read pieces of time information in the storage unit 504.

Figure 10:
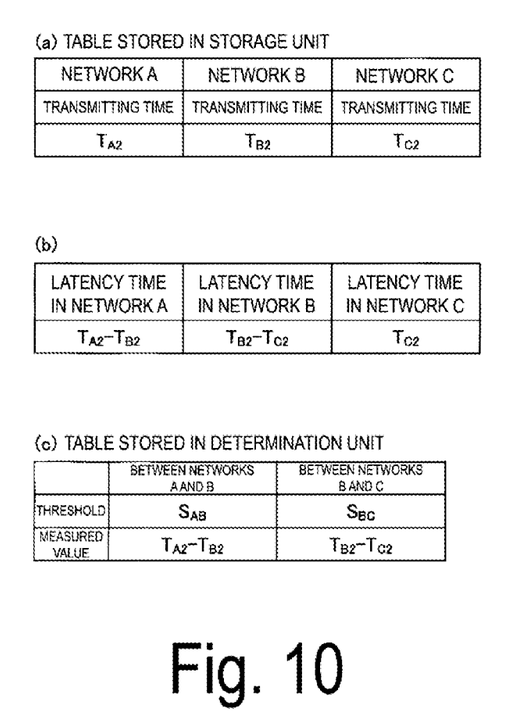
FIG. 10 is a diagram illustrating tables to be stored, for example.

A table to be stored in the storage unit 504 is illustrated in FIG. 10(*a*). As illustrated in FIG. 10(*a*), the storage unit 504 stores the sending times of individual networks.

Next, the latency measurement unit 505 refers to the sending times stored in the storage unit 504 to calculate (measure) latency in each of the networks. As illustrated in FIG. 10(*b*), for example, latency time in the network A is calculated by: $T_{A2}-T_{B2}$.

Next, the determination unit 506 compares the difference between the sending times (for example, $T_{A2}-T_{B2}$) and a threshold to thereby determine whether latency between the networks is normal. If the difference is greater than the threshold, data related to the transmitting time is discarded. Alternatively, the whole packets may be discarded. Note that the threshold is set for each network in advance. FIG. 10(*c*) illustrates a table stored in the determination unit 506. The thresholds for individual networks are stored in the table. Note that determination of propagation delay between networks is performed in corresponding transfer apparatuses at the receiving edge, and thus the determination unit 506 in the measurement unit (receiver) 500 may be omitted.

For example, the packet transmission unit 507 may output the input packets without subjecting the packets to processing. Alternatively, the packet transmission unit 507 may output processed packets obtained by removing time information from the input packets. Alternatively, the packet transmission unit 507 may output processed packets obtained by removing time information from the input packets and adding measurement results (such as the latency time in each network).

Example of Hardware Configuration

Each of the apparatuses (each of the transfer apparatuses and the measurement unit (receiver)) described in Example 1 and Example 2 can be implemented by causing a computer to execute a program describing details of processing as described in the embodiment, for example.

In other words, each of the apparatuses can be implemented by executing a program corresponding to the processing carried out by the apparatus, using hardware resources such as a CPU and a memory incorporated in the computer. The aforementioned program can be recorded, saved, and distributed in a computer-readable recording medium (portable memory or the like). In addition, the aforementioned program can also be provided through a network such as the Internet, an e-mail, or the like.

Figure 11:
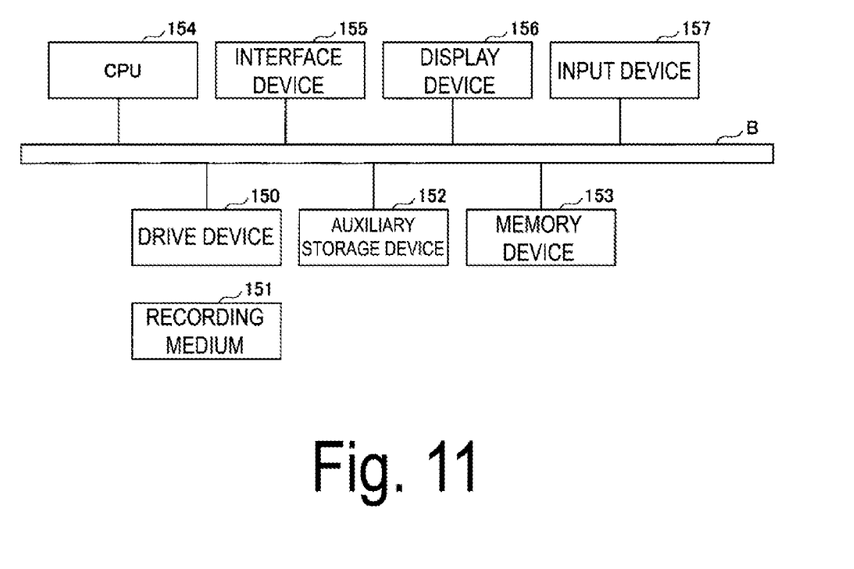
FIG. 11 is a diagram illustrating a hardware configuration example of an apparatus.

FIG. 11 is a diagram illustrating a hardware configuration example of the aforementioned computer according to the present embodiment. The computer in FIG. 11 has a drive device 150, an auxiliary storage device 152, a memory device 153, a CPU 154, an interface device 155, a display device 156, an input device 157, and the like that are connected to each other via a bus B.

The program that implements the processing performed in the computer is, for example, provided by a recording medium 151, such as a CD-ROM or a memory card. If the recording medium 151 storing the program is set in the drive device 150, then the program is installed in the auxiliary storage device 152 from the recording medium 151 via the drive device 150. However, the program is not necessarily installed from the recording medium 151 and may be downloaded from another computer via a network. The auxiliary storage device 152 stores the installed program and also stores required files, data, and the like.

The memory device 153 reads and stores the program from the auxiliary storage device 152 in a case in which a command for activating the program is issued. The CPU 154 implements the functions related to the apparatus, in accordance with the program stored in the memory device 153. The interface device 155 is used as an interface for establishing connection to a network. The display device 156 displays a graphical user interface (GUI) or the like based on the program. The input device 157 is configured of a keyboard and a mouse, a button, a touch panel, or the like, and is used to allow for inputs of various operation commands.

SUMMARY OF EMBODIMENT

As described in the above, a system according to the embodiment of the present invention is a measurement system including: a first transfer apparatus provided at a packet receiving edge of one network; a second transfer apparatus provided at a packet sending edge of the one network; and a measurement apparatus configured to receive a packet transmitted through the first transfer apparatus, the one network, and the second transfer apparatus. Provided is the measurement system in which, the first transfer apparatus, when the first transfer apparatus receives the packet, adds received time of the packet to the packet and transmits the packet to which the received time is added, the second transfer apparatus receives the packet to which the received time is added, adds sending time and a signature specific to the one network to the packet, and transmits the packet to which the received time, the sending time, and the signature are added, and the measurement apparatus receives the packet to which the received time, the sending time, and the signature are added and calculates a difference between the sending time and the received time to measure latency in the one network.

The measurement system may further include: a third transfer apparatus of another network provided at a packet receiving edge, the third transfer apparatus being posterior to the second transfer apparatus. The third transfer apparatus may add received time to the packet that the third transfer apparatus received and transfers the packet, and the measurement apparatus may determine validity of time information, based on a difference between the received time added by the third transfer apparatus and the sending time added by the second transfer apparatus.

A system according to the embodiment of the present invention is a measurement system including: a first transfer apparatus provided at a packet sending edge of a first network; a second transfer apparatus provided at a packet sending edge of a second network adjacent to the first network; and a measurement apparatus configured to receive a packet being transmitted through the first transfer apparatus, the second network, and the second transfer apparatus. Provided is the measurement system in which, the first transfer apparatus, when the first transfer apparatus receives the packet, adds first sending time being sending time of the packet from the first network and a first signature being a signature specific to the first network to the packet and transmits the packet to which the first sending time and the first signature are added, the second transfer apparatus receives the packet to which the first sending time and the first signature are added, adds second sending time being sending time of the packet from the second network and a second signature being a signature specific to the second network to the packet, and transmits the packet to which the first sending time, the first signature, the second sending time, and the second signature are added, and the measurement apparatus receives the packet to which the first sending time, the first signature, the second sending time, and the second signature are added and calculates a difference between the second sending time and the first sending time to measure latency in the second network.

The measurement system may further include a third transfer apparatus of the second network provided at a packet receiving edge, the third transfer apparatus being posterior to the first transfer apparatus. The third transfer apparatus may determine validity of time information, based on a difference between received time at which the third transfer apparatus receives the packet from the second transfer apparatus and the first sending time added by the first transfer apparatus.

Although the embodiment has been described above, the present invention is not limited to such a specific embodiment, and various modifications and changes can be made within the scope of the gist of the present invention described in the claims.

REFERENCE SIGNS LIST

A1-C1 Transfer apparatus
A2-C2 Transfer apparatus
310, 320, 610, 620 Transfer apparatus
100, 400 Measurement unit (sender)
200, 500 Measurement unit (receiver)
1000, 2000 Time delivery unit
201 Packet reception unit
202 Decryption unit
203 Timestamp reading unit
204 Storage unit
205 Latency measurement unit
206 Determination unit
207 Packet transmission unit
208 Time synchronization unit
311, 321 Packet reception unit
312, 322 Timestamp information adding unit
313, 323 Time synchronization unit
314, 324 Packet transmission unit.
325 Encryption unit
501 Packet reception unit
502 Decryption unit
503 Timestamp reading unit
504 Storage unit
505 Latency measurement unit
506 Determination unit
507 Packet transmission unit
508 Time synchronization unit
611, 621 Packet reception unit
612 Decryption unit
613 Timestamp reading unit
614 Storage unit
615 Determination unit
616, 624 Packet transmission unit
617, 625 Time synchronization unit
622 Timestamp information adding unit
623 Encryption unit
150 Drive device
151 Recording medium
152 Auxiliary storage device
153 Memory device
154 CPU
155 Interface device
156 Display device
157 Input device

The invention claimed is:

1. A measurement system comprising:
a first transfer apparatus provided at a packet receiving edge of one network;
a second transfer apparatus provided at a packet sending edge of the one network; and
a measurement apparatus configured to receive a packet transmitted through the first transfer apparatus, the one network, and the second transfer apparatus,
wherein, the first transfer apparatus, when the first transfer apparatus receives the packet, adds received time of the packet to the packet and transmits the packet to which the received time is added,
the second transfer apparatus receives the packet to which the received time is added, adds sending time and a signature specific to the one network to the packet, and transmits the packet to which the received time, the sending time, and the signature are added, and
the measurement apparatus receives the packet to which the received time, the sending time, and the signature are added and calculates a difference between the sending time and the received time to measure latency in the one network.

2. The measurement system according to claim 1, further comprising
a third transfer apparatus of another network provided at a packet receiving edge, the third transfer apparatus being posterior to the second transfer apparatus,
wherein the third transfer apparatus adds received time to the packet that the third transfer apparatus received and transfers the packet, and
the measurement apparatus determines validity of time information, based on a difference between the received time added by the third transfer apparatus and the sending time added by the second transfer apparatus.

3. A measurement system comprising:
a first transfer apparatus provided at a packet sending edge of a first network;

a second transfer apparatus provided at a packet sending edge of a second network adjacent to the first network; and a measurement apparatus configured to receive a packet being transmitted through the first transfer apparatus, the second network, and the second transfer apparatus, wherein, the first transfer apparatus, when the first transfer apparatus receives the packet, adds first sending time being sending time of the packet from the first network and a first signature being a signature specific to the first network to the packet and transmits the packet to which the first sending time and the first signature are added, the second transfer apparatus receives the packet to which the first sending time and the first signature are added, adds second sending time being sending time of the packet from the second network and a second signature being a signature specific to the second network to the packet, and transmits the packet to which the first sending time, the first signature, the second sending time, and the second signature are added, and the measurement apparatus receives the packet to which the first sending time, the first signature, the second sending time, and the second signature are added and calculates a difference between the second sending time and the first sending time to measure latency in the second network.

4. The measurement system according to claim 3, further comprising a third transfer apparatus of the second network provided at a packet receiving edge, the third transfer apparatus being posterior to the first transfer apparatus, wherein the third transfer apparatus determines validity of time information, based on a difference between received time at which the third transfer apparatus receives the packet from the second transfer apparatus and the first sending time added by the first transfer apparatus.

5. A measurement method to be performed by a measurement system, the measurement system including a first transfer apparatus provided at (i) a packet receiving edge of one network or (ii) a packet sending edge of the one network;

a second transfer apparatus provided at (i) a packet sending edge of the one network or (ii) a packet sending edge of a second network adjacent the one network; and a measurement apparatus configured to (i) receive a packet transmitted through the first transfer apparatus, the one network, and the second transfer apparatus or (ii) receive a packet being transmitted through the first transfer apparatus, the second network, and the second transfer apparatus, the measurement method comprising:

by the first transfer apparatus, when a packet is received, (i) adding received time of the packet to the packet and transmitting the packet to which the received time is added or (ii) adding first sending time being sending time of the packet from the first network and a first signature being a signature specific to the first network to the packet and transmitting the packet to which the first sending time and the first signature are added, by the second transfer apparatus, (i) receiving the packet to which the received time is added, adding sending time and a signature specific to the one network to the packet, and transmitting the packet to which the received time, the sending time, and the signature are added, or (ii) receiving the packet to which the first sending time and the first signature are added, adding second sending time being sending time of the packet from the second network and a second signature being a signature specific to the second network to the packet, and transmitting the packet to which the first sending time, the first signature, the second sending time, and the second signature are added, and by the measurement apparatus, (i) receiving the packet to which the received time, the sending time, and the signature are added and calculating a difference between the sending time and the received time to measure latency in the one network or (ii) receiving the packet to which the first sending time, the first signature, the second sending time, and the second signature are added and calculating a difference between the second sending time and the first sending time to measure latency in the second network.

6. The measurement method according to claim 5, wherein the measurement system further includes a third transfer apparatus of another network provided at a packet receiving edge, the third transfer apparatus being posterior to the second transfer apparatus, the measurement method further comprising:

by the third transfer apparatus, adding received time to the packet that the third transfer apparatus received and transferring the packet, and by the measurement apparatus, determining validity of time information, based on a difference between the received time added by the third transfer apparatus and the sending time added by the second transfer apparatus.

7. The measurement method according to claim 5, wherein the measurement system further includes a third transfer apparatus of the second network provided at a packet receiving edge, the third transfer apparatus being posterior to the first transfer apparatus, the measurement method further comprising:

by the third transfer apparatus, determining validity of time information, based on a difference between received time at which the third transfer apparatus receives the packet from the second transfer apparatus and the first sending time added by the first transfer apparatus.

* * * * *